United States Patent
Golombowski et al.

(10) Patent No.: US 9,499,727 B2
(45) Date of Patent: Nov. 22, 2016

(54) CURABLE COMPOSITIONS CONTAINING ISOCYANATE FUNCTIONAL COMPONENTS HAVING IMPROVED DURABILITY

(71) Applicant: DOW GLOBAL TECHNOLOGIES LLC, Midland, MI (US)

(72) Inventors: Dietmar Golombowski, St. Gallen (CH); Dirk Schwoeppe, Freienbach (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 14/409,799

(22) PCT Filed: Feb. 21, 2013

(86) PCT No.: PCT/US2013/026991
§ 371 (c)(1),
(2) Date: Dec. 19, 2014

(87) PCT Pub. No.: WO2014/014499
PCT Pub. Date: Jan. 23, 2014

(65) Prior Publication Data
US 2015/0175860 A1    Jun. 25, 2015

Related U.S. Application Data

(60) Provisional application No. 61/671,927, filed on Jul. 16, 2012.

(51) Int. Cl.
| | |
|---|---|
| *B32B 37/12* | (2006.01) |
| *B32B 37/18* | (2006.01) |
| *C08G 18/12* | (2006.01) |
| *C08G 18/20* | (2006.01) |
| *C08G 18/40* | (2006.01) |
| *C08G 18/63* | (2006.01) |
| *C09J 11/04* | (2006.01) |
| *C09J 175/04* | (2006.01) |
| *C09J 175/08* | (2006.01) |

(52) U.S. Cl.
CPC .............. *C09J 175/08* (2013.01); *B32B 37/12* (2013.01); *B32B 37/18* (2013.01); *C08G 18/12* (2013.01); *C08G 18/2081* (2013.01); *C08G 18/4072* (2013.01); *C08G 18/632* (2013.01); *C09J 11/04* (2013.01); *C09J 175/04* (2013.01); *B32B 2037/1269* (2013.01); *B32B 2457/00* (2013.01); *B32B 2605/00* (2013.01); *C08G 2190/00* (2013.01)

(58) Field of Classification Search
CPC ...... C09J 175/08; C09J 175/04; C09J 11/04; C08G 18/12; C08G 18/632; C08G 18/2081; C08G 18/4072; C08G 2190/00; B32B 37/12; B32B 37/18; B32B 2037/1269; B32B 2457/00; B32B 2605/00
See application file for complete search history.

(56) References Cited

U.S. PATENT DOCUMENTS

| | | | |
|---|---|---|---|
| 3,707,521 A | 12/1972 | De Santis | |
| 3,779,794 A | 12/1973 | De Santis | |
| 4,345,053 A | 8/1982 | Rizk et al. | |
| 4,374,237 A | 2/1983 | Berger et al. | |
| 4,525,511 A | 6/1985 | Kirby et al. | |
| 4,625,012 A | 11/1986 | Rizk et al. | |
| 4,687,533 A | 8/1987 | Rizk et al. | |
| 4,780,520 A | 10/1988 | Rizk et al. | |
| 4,820,368 A * | 4/1989 | Markevka .............. | C08G 18/10 156/307.3 |
| 5,063,269 A | 11/1991 | Hung | |
| 5,361,318 A | 11/1994 | Go et al. | |
| 5,599,895 A | 2/1997 | Heider | |
| 5,603,798 A | 2/1997 | Bhat | |
| 5,623,044 A | 4/1997 | Chiao | |
| 5,747,581 A | 5/1998 | Proebster et al. | |
| 5,851,661 A | 12/1998 | Werenicz et al. | |
| 5,852,137 A | 12/1998 | Hsieh et al. | |
| 5,922,809 A | 7/1999 | Bhat et al. | |
| 5,965,662 A | 10/1999 | Krebs et al. | |
| 5,976,305 A | 11/1999 | Bhat et al. | |
| 6,512,033 B1 | 1/2003 | Wu | |
| 6,709,539 B2 | 3/2004 | Zhou | |
| 6,906,148 B2 | 6/2005 | Krebs et al. | |
| 6,965,008 B2 | 11/2005 | Symietz et al. | |
| 7,101,950 B2 | 9/2006 | Zhou et al. | |
| 7,416,599 B2 | 8/2008 | Hsieh et al. | |
| 7,892,395 B2 | 2/2011 | Tribelhorn et al. | |

(Continued)

FOREIGN PATENT DOCUMENTS

| | | |
|---|---|---|
| EP | 1433802 A1 | 6/2004 |
| EP | 1578834 A1 | 9/2005 |
| WO | 02053671 A1 | 7/2002 |

OTHER PUBLICATIONS

International Search Report and Written Opinion for Application No. PCT/US2013/026991, dated Apr. 25, 2013.

(Continued)

*Primary Examiner* — Patrick Niland (74) *Attorney, Agent, or Firm* — The Dobrusin Law Firm, P.C.; Norman L. Sims (57) ABSTRACT

A composition comprising: a) one or more isocyanate functional prepolymers; b) one or more amorphous linear polymers having sufficient polarity to form a homogeneous mixture with the one or more isocyanate functional prepolymers and having a hydroxyl number of about 10 or less; c) one or more forms of carbon black; and d) one or more catalysts for the reaction of isocyanate moieties with active hydrogen atom containing groups.

20 Claims, 1 Drawing Sheet

(56) References Cited

U.S. PATENT DOCUMENTS

2006/0096694 A1  5/2006  Zhou
2010/0154969 A1  6/2010  Golombowski et al.

OTHER PUBLICATIONS

International Preliminary Report on Patentability for Application No. PCT/US2013/026991, dated Oct. 21, 2014.

* cited by examiner

CURABLE COMPOSITIONS CONTAINING ISOCYANATE FUNCTIONAL COMPONENTS HAVING IMPROVED DURABILITY

FIELD OF THE INVENTION

The invention relates to curable compositions containing isocyanate functional components and amorphous linear polymers, adhesives based on such curable compositions; and methods for bonding substrates together utilizing the compositions.

BACKGROUND OF THE INVENTION

Compositions having isocyanate functional components are utilized in a variety of useful products such as adhesives, sealers, molded products and foams, which may be utilized in construction, vehicle manufacture, assembly of electronic subassemblies and devices, and toys. The adhesives have found widespread use because they provide reasonable processing conditions and exhibit good adhesion to many substrates, such as bonding windows into structures, or parts to a structure. In automotive assembly plants windows are bonded in with one part adhesive compositions containing isocyanate functional components and a cure catalyst which cure as a result of exposure to moisture. The dispensing equipment for one part adhesives is less complex than the equipment used to apply two-part adhesives. One part moisture curing adhesives known in the art are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852,137, U.S. Pat. No. 5,922,809, U.S. Pat. No. 5,976,305, U.S. Pat. No. 5,852,137 and U.S. Pat. No. 6,512,033, relevant portions incorporated herein by reference and examples include BETASEAL™ 15630, 15625, 61355 adhesives available from The Dow Chemical Company, EFBOND™ windshield adhesives available from Eftec, WS 151™, WS212™ adhesives available from Yokohama Rubber Company, and SIKAFLEX™ adhesives available from Sika.

Two-part polyisocyanate based adhesives comprise, in one part, a polyisocyanate or an isocyanate functional prepolymer and, in a second part, a curing agent and catalyst for the reaction. The two parts are contacted to start cure and cure much faster than one-part adhesives. Examples of such adhesive systems are disclosed in U.S. Pat. No. 7,892,395; U.S. Pat. No. 6,965,008; EP 1433802 and EP 1578834, all incorporated herein by reference. Two part adhesives can be used for bonding replacement windows into vehicles, bonding parts together or parts to structures.

In automobile factories windows are installed using robots and computer controlled processing which facilitates the use of a variety of high performance adhesives, for instance nonconductive adhesives and high modulus adhesives. The speed of cure is not a significant issue because new vehicles are not driven a significant distance for several days after window installation. Conversely, when a vehicle needs a window replaced, it is often performed in a remote location by an installer working from a vehicle. In this environment, speed of cure is important as the vehicle owner desires to drive the vehicle as soon as possible after installation of the window. Adhesives useful in replacing windows for vehicles which facilitate fast drive away times are known see Bhat, U.S. Pat. No. 5,976,305 and Zhou, U.S. Pat. No. 6,709,539. The introduction of various high performance adhesive compositions used for installing windows in automobile factories presents a problem for replacement window installers. Adhesives that meet all the varied performance requirements are not available in the market place. It is difficult to formulate many high performance adhesive compositions to allow rapid drive away times that do not sag or string. Sag is the loss of the shape of the adhesive bead, often as the result of gravitational forces. If severe enough, this deformation can interfere in the proper installation and sealing of the window into the vehicle. Stringing of an adhesive is the formation of a long string of adhesive at the end of the bead of adhesive dispensed which can complicate application of the adhesive and cause imperfections in the installed adhesive bead. A replacement window installer often has to carry a variety of adhesives to match the replacement adhesive to the properties of the original adhesive.

Adhesives have been developed which provide good initial green strength that allow adhesives to hold the glass in place without fixturing. This is achieved through the inclusion of crystalline polyesters in the adhesive which have hot melt properties requiring that the adhesive be melted and applied hot; Proebster, U.S. Pat. No. 5,747,581, incorporated herein by reference. The problem with these adhesives is that they require heat and complex equipment for their use. The initial green strength may not be sufficient for rapid drive away time. Because of the proliferation of hot melt adhesives in automobile window replacement, many installers insist on heating adhesives prior to applying the adhesive to the window or the window flange, which may exacerbate sagging and/or stringing.

Several approaches to providing non-conductive adhesives including using non-conductive carbon black and polyester polyols in adhesive formulations are known U.S. Pat. No. 7,101,950. WO 02/053671 discloses the use of low or non-oxidized carbon black with polycarbonate based polyols to achieve this objective. The problem is that low conductive carbon black and polycarbonate polyols are significantly more expensive than standard grades of carbon black which are conductive and other polyols. Zhou US2006/0096694A1 discloses an adhesive which achieves a variety of high performance properties which contains polyester polyols and standard carbon black. The nonconductive properties are imparted by carefully limiting the amount of carbon black. The amount of carbon black impacts the rheological properties of the adhesive and thus the sag and stringiness of the adhesive. Polyester based isocyanate functional prepolymers are used to improve fixturing properties. As automotive designs have changed more robust adhesive systems are required. Polyester based isocyanate functional prepolymers can be shear sensitive and processing of adhesives containing them can negatively impact the properties of the adhesive and some of these adhesive systems may not be suitable for use with the new designs.

What is needed is compositions which are useful as adhesives for bonding glass into structures which may be formulated to exhibit a variety of high performance properties (such as high modulus and nonconductive nature), exhibit fast safe drive away times when applied under a variety of conditions, fast strength development, can be applied without heating the adhesive, can be applied under a wide range of environmental conditions, do not require expensive ingredients, do not sag or string when applied and exhibit improved shear sensitivity.

SUMMARY OF THE INVENTION

The invention is a composition comprising: a) one or more isocyanate functional prepolymers; b) one or more amorphous linear polymers having sufficient polarity to form a homogeneous mixture with the one or more isocyanate functional prepolymers and having a hydroxyl number of about 10 or less; c) one or more forms of carbon black; and d) one or more catalysts for the reaction of isocyanate moieties with active hydrogen atom containing groups. In a preferred embodiment the one or more isocyanate functional prepolymers comprise one or more prepolymers containing isocyanate functional groups and alkoxysilane groups and the composition is a one part composition. In another preferred embodiment, the one or more forms of carbon black comprise non-conductive carbon black, conductive carbon black, or both, present in an amount below the percolation threshold for the composition. In another preferred embodiment c) one or more one or more forms of carbon black comprise non-conductive carbon black, conductive carbon black present in an amount below the percolation threshold for the composition; the composition further comprises e) one or more compounds, oligomers or prepolymers containing more than one functional group reactive with isocyanate groups; wherein the composition is a two part composition with components a) and b) in one part and components d) and e) are in a second part. The curing agent is preferably one or more of polyols, polyamines, crosslinking agents and chain extenders. Preferably polyol curing agents are polyols having dispersed therein or grafter to the polyol backbone organic particles.

The invention further relates to a method of bonding two or more substrates together which comprises contacting the two or more substrates together with a composition according to the invention disposed along at least a portion of the area wherein the substrates are in contact. In two part compositions, the two parts are contacted prior to contacting the curable composition with the surface of one or more of the substrates.

In some embodiments the compositions contain one or more of the following recited features: one or more fillers other than carbon black; the one or more amorphous linear polymers comprise blocks of polyester and polyalkylene oxides or a polyolefin based polymer having functional polar groups; the one or more amorphous linear polymers exhibit a softening point above ambient temperature; the one or more amorphous linear polymers exhibit a softening point of from about 60 to about 140° C.; the one or more amorphous linear polymers exhibit a glass transition temperature of from about 50 to about 130° C.; one or more fillers, other than carbon black, comprising one or more of calcium carbonate and clay; the one or more forms of carbon black comprise non-conductive carbon black, conductive carbon black, or both, present in an amount below the percolation threshold for the composition; the one or more prepolymers containing isocyanate functional groups comprise one of more prepolymers containing isocyanate functional groups and alkoxysilane groups; the composition is a one part or two part composition.

The curable compositions may be used as an adhesive to bond substrates together, which may be similar and dissimilar, for instance, plastics, glass, wood, ceramics, metal, coated substrates and the like. They may be used to bond glass or transparent plastic structures to other substrates such as vehicles and buildings; and parts of modular components together, such as vehicle modular components. Structures bonded together utilizing such adhesive compositions remain bonded together for a substantial portion or all of the structures useful life. Advantageously the adhesive is pumpable, sag and string resistant and functional, bonds parts together, at temperatures between about 20° C. and about 80° C. and are shear stable. Preferably, the composition exhibits a sag of an uncured sample of about 10 mm or less. This allows the adhesives prepared from compositions of the invention to be applied at a wide range of ambient temperatures. Heated application machinery is not necessary for the application of the adhesives. Furthermore, the adhesives demonstrate rapid strength development which facilitates rapid drive away times of preferably one hour, and more preferably 30 minutes, after application of the adhesive at temperatures of from about 0° F. (−18° C.) to about 115° F. (46° C.). In particular, windshields installed under such conditions meet United States Federal Motor Vehicle Safety Standard (FMVSS) 212. In some preferred embodiments the compositions are nonconductive and demonstrate a dielectric constant of about 15 or less. The compositions preferably demonstrate a modulus after application for two weeks of about 2 MPa or greater, more preferably about 2.2 MPa or greater and preferably about 3 MPa or less according to ASTM D4065 measured at 25° C. The compositions of the invention exhibit a storage modulus, G', of about $5.3 \times 10^5$ Pa or greater, preferably about 0.53 MPa or greater and most preferably about 1.0 MPa or greater. Pumpability of the composition can be measured according to the press flow viscosity test described hereinafter; according to this test the composition exhibits a press flow viscosity of 8 grams per minute or higher, more preferably about 12 grams per minute or higher and most preferably about 16 grams per minute or higher at about 23° C.

DETAILED DESCRIPTION

The explanations and illustrations presented herein are intended to acquaint others skilled in the art with the invention, its principles, and its practical application. The following claims are hereby incorporated by reference into this written description. This application claims priority from provisional application Ser. No. 61/671,927, filed Jul. 16, 2012 which is incorporated herein by reference in its entirety.

One or more means that at least one, or more than one, of the recited components may be used. Nominal with respect to functionality means the theoretical functionality; this can be calculated from the stoichiometry of the ingredients used. The actual functionality is different due to imperfections in raw materials, incomplete conversion of the reactants and formation of by-products. Isocyanate content means the weight percentage of isocyanate moieties based on the total weight of the prepolymer. The term isocyanate-reactive compound means any organic compound having nominally at least two isocyanate-reactive moieties, including active hydrogen containing moieties, and preferably refer to moieties containing a hydrogen atom which, because of its position in the molecule, displays significant activity according to the Zerewitinoff test described by Wohler in the *Journal of the American Chemical Society*, Vol. 49, p. 3181 (1927). Illustrative of such isocyanate reactive moieties, are —COOH, —OH, —NH$_2$, —NH—, —CONH$_2$, —SH, and CONH—. Preferable isocyanate reactive moiety containing compounds include polyols, polyamines, polymercaptans and polyacids, more preferably polyols, and most preferably polyether polyols. Reactive means that the curable composition contains components which react to form a polymeric matrix that is set irreversibly once cured.

The compositions can be any reactive system containing isocyanate functional prepolymers, which may further comprise alkoxysilane groups. The reactive systems may be one or two-part systems, which may be useful as adhesives. Isocyanate based (polyurethane or polyurea forming) curable systems comprise one or more isocyanate functional prepolymers which contain on average more than one isocyanate functional group per molecule. An isocyanate prepolymer can be any prepolymer prepared by reaction of an isocyanate functional compound with one or more compounds having on average more than one isocyanate reactive functional moieties under conditions such that the prepolymer prepared has on average more than one isocyanate moiety (group) per molecule. The isocyanate functional prepolymer is present in the curable composition in a sufficient amount to form a cured component when exposed to curing conditions. In a one-part system the isocyanate functional prepolymer further comprises, an amorphous linear polymer, a catalyst and other components as described hereinafter. The one component adhesive systems typically cure by moisture curing and once formulated are packaged in air and moisture proof containers to prevent curing before application. In adhesive compositions, the adhesive is capable of bonding substrates together such that the substrates remain bound together when exposed to temperatures of about −30° C. to about 100° C. for long periods of time, such as 10 years; and up to temperatures of about 180° C. for short periods, up to 30 minutes.

In a two-part curable system, the two parts are reactive with one another and when contacted undergo a curing reaction. One part of the composition comprises, or contains, one or more of isocyanate functional prepolymers wherein one or more of the prepolymers may contain isocyanate functional groups and alkoxysilane groups. This is referred to as the resin side or A side. The other component of the composition comprises, or contains, one or more compounds, oligomers or prepolymers having on average more than one group reactive with isocyanate moieties as described herein. The second part is known as the curative or B side. Compounds having on average one or more isocyanate reactive groups can be prepolymers, small chain compounds such as difunctional chain extenders or polyfunctional crosslinking agents, or mixtures thereof. A catalyst may be utilized in the curative side. The reaction product is a cured product which is capable of performing the desired function.

The one or more isocyanate functional prepolymers are present in sufficient quantity to provide cohesive strength, and in adhesive uses, adhesive character to the cured compositions. Such isocyanate functional prepolymers have an average isocyanate functionality sufficient to allow the preparation of a crosslinked polyurethane upon cure and not so high that the isocyanate functional components are unstable. The isocyanate functional prepolymers preferably have a free isocyanate content which facilitates acceptable strength in the compositions prepared, preferably after 60 minutes. For one-part moisture curable systems, the isocyanate content in the isocyanate functional prepolymers is preferably in the range of about 0.05 percent to about 10 percent, more preferably in the range of about 0.5 percent to about 5.0 percent and most preferably in the range of about 0.8 percent to about 3.0 percent. In one part compositions, the free isocyanate content is preferably about 0.05 percent by weight or greater based on the weight of the isocyanate functional prepolymer, and more preferably about 0.5 percent by weight or greater, and most preferably about 0.8 percent by weight or greater, and preferably about 10.0 percent by weight or less, more preferably about 5.0 or less, even more preferably about 3.0 percent by weight or less. The isocyanate functional prepoymers preferably exhibit a polydispersity of about 2.5 or less, more preferably about 2.3 or less and most preferably about 2.1 or less. For two-part isocyanate based adhesive systems, the isocyanate content in the isocyanate functional prepolymers is preferably about 6 percent percent by weight or greater, more preferably about 8 percent percent by weight or greater and most preferably about 10 percent percent by weight or greater. For two-part isocyanate based adhesive systems, the isocyanate content in the isocyanate functional prepolymers is preferably about 35 percent by weight or less, more preferably about 30 percent by weight or less and most preferably about 25 percent by weight or less.

Preferably, the viscosity of the isocyanate functional prepolymers is about 200 Pa·s or less, and more preferably about 150 Pa·s or less, and most preferably about 120 Pa·s or less. Preferably, the viscosity of the isocyanate functional prepolymers is about 50 Pa·s or greater. The viscosity of the compositions can be adjusted with fillers. Below about 50 Pa·s a composition prepared from the isocyanate functional polymers may exhibit poor high speed tensile strength. Above about 150 Pa·s the isocyanate functional components, prepolymer, may be unstable and hard to pump. "Viscosity" as used herein is measured by the Brookfield Viscometer, Model DV-E with a RV spindle #5 at a speed of 5 revolutions per second and at a temperature of 23° C.

Preferably, the polyisocyanates useful in preparing the isocyanate functional prepolymers include any aliphatic, cycloaliphatic, araliphatic, heterocyclic or aromatic polyisocyanate, or mixtures thereof. Preferably, the polyisocyanates used have an average isocyanate functionality of about 2.0 or greater and an equivalent weight of about 80 or greater. Preferably, the isocyanate functionality of the polyisocyanate is about 2.0 or greater, more preferably about 2.2 or greater, and is most preferably about 2.4 or greater; and is preferably about 4.0 or less, more preferably about 3.5 or less, and most preferably about 3.0 or less. Higher functionality may also be used, but may cause excessive crosslinking, and result in a composition which is too viscous to handle and apply easily, and can cause the cured composition to be brittle. Preferably, the equivalent weight of the polyisocyanate is about 80 or greater, more preferably at about 110 or greater, and is most preferably about 120 or greater; and is preferably about 300 or less, more preferably about 250 or less, and most preferably about 200 or less. Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivatives thereof. Preferably, the aromatic isocyanates have the isocyanate groups bonded directly to aromatic rings. Even more preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanatocylohexyl)methane, and trimethyl hexa-methylene diisocyanate. The most preferred isocyanate is diphenylmethane diisocyanate. The amount of isocyanate containing compound used to prepare the isocyanate functional prepolymers is that amount that gives the desired properties, such as free isocyanate content and viscosities. Preferably, the isocyanates are used to prepare the isocyanate prepolymers in an amount of about 1.3 equivalents of isocyanate (NCO) per equivalent of active hydrogen or greater, more preferably about 1.4 equivalents or greater and most preferably about 1.5 equivalents or greater. Preferably, the polyisocyanates used to prepare the isocyanate functional prepolymers are used in an amount of about 2.0 equivalents of isocyanate per equivalent of active hydrogen or less, more preferably about 1.8 equivalents or less and most preferably about 1.6 equivalents less.

Preferably the isocyanate functional prepolymers are the reaction product of one or more polyisocyanates and one or more isocyanate reactive compounds wherein an excess of polyisocyanate is present on an equivalents basis. Preferably the isocyanate reactive compounds are one or more polyols, and include those disclosed in Wu, U.S. Pat. No. 6,512,033 at column 4, line 10 to line 64, incorporated herein by reference, for example, polyether polyols, polyester polyols, poly(alkylene carbonate) polyols, hydroxyl containing polythioethers and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or mixtures thereof. Mixtures of alkylene oxide can be arranged randomly or in blocks. In some preferred embodiments, the polyol comprises propylene oxide chains with ethylene oxide chains capping the polyol. Preferably the polyols are a mixture of diols and triols. Preferably the ethylene oxide capped polypropylene oxides are hydrophobic, and preferably contain less than about 20 mole percent of ethylene oxide and more preferably less than 10 mole percent of ethylene oxide in the backbone. Preferably, the isocyanate-reactive prepolymer has a functionality of about 1.8 or greater, more preferably about 1.9 or greater, and is most preferably about 1.95 or greater; and is preferably about 4.0 or less, more preferably about 3.5 or less, and is most preferably about 3.0 or less. Preferably, the equivalent weight of the isocyanate-reactive compound is about 200 or greater, more preferably about 500 or greater, and is more preferably about 1,000 or greater; and is preferably about 5,000 or less, more preferably about 3,000 or less, and is most preferably about 2,500 or less.

The compositions may further comprise one or more prepolymers containing one or more polyether polyols having dispersed therein or grafted to the backbone one or more organic based polymer particles dispersed therein. Preferably the one or more organic based polymer particles are based on monovinylidene aromatic monomers and copolymers of monovinylidene aromatic monomers with conjugated dienes, acrylates, methacrylates, unsaturated nitrites or mixtures thereof. The copolymers can be block or random copolymers. More preferably the one or more organic based polymer particles comprise copolymers of unsaturated nitrites, conjugated dienes and a monovinylidene aromatic monomer, a copolymer of an unsaturated nitrile and a monovinylidene aromatic monomer or a polyurea. Even more preferably the particles comprise a polyurea or polystyrene-acrylonitrile copolymer with the polystyrene-acrylonitrile copolymers being most preferred. Preferably the particle size of the one or more organic based polymer particles is about 10 microns or greater and more preferably the particle size is about 20 microns or greater. Preferably the particle size is about 50 microns or less and more preferably the particle size is about 40 microns or less. The polyol having organic polymer particles dispersed therein or grafted thereto contain a sufficient amount of the particles such that the adhesive upon cure has sufficient hardness for the desired use and not so much such that the cured adhesive has too much elasticity as defined by elongation. Preferably the polyols contain about 20 percent by weight or greater of organic polymer particles based on the weight of the polyols, preferably about 30 percent by weight or greater and more preferably about 35 percent by weight or greater. Preferably the polyols contain about 60 percent by weight or less of the particles based on the weight or the particles, preferably about 50 percent by weight or less and more preferably about 45 percent by weight or less. Preferably, the organic based polymer particles are is included in the prepolymer by inclusion of a polyol containing them, preferably a triol. having dispersed therein particles of an organic based polymer, for example one or more of thermoplastic polymers, rubber-modified thermoplastic polymers or a polyureas dispersed in one or more triols. Preferable polyols having organic polymer particles dispersed therein or grafted thereto are disclosed in Zhou, U.S. Pat. No. 6,709,539 at column 4, line 13 to column 6, line 18, incorporated herein by reference. Preferably, the polyols used to disperse the organic particles is one or more polyether triols as described herein. Preferably prepolymers containing one or more organic based polymers particles are present in compostions of the invention in a sufficient amount to enhance the elastomeric nature and the modulus of the compositions. Preferably such prepolymers are contained in the composition in an amount below about 5 percent by weight and greater than 0 if present and more preferably about 0.1 percent by weight or greater.

The isocyanate reactive compounds are present in an amount sufficient to react with most of the isocyanate groups of the isocyanates leaving enough isocyanate groups to correspond with the desired isocyanate content of the prepolymer. Preferably, the compounds containing isocyanate reactive groups are present in an amount of about 50 percent by weight or greater based on the prepolymer, more preferably about 65 percent by weight or greater and most preferably about 80 percent by weight or greater. Preferably, the compounds containing isocyanate reactive groups are present in an amount of about 90 percent by weight or less based on the prepolymer and most preferably about 85 percent by weight or less.

The isocyanate functional prepolymers used in the invention may include isocyanate functional prepolymers containing isocyanate moieties and alkoxysilane moieties. All of isocyanate functional prepolymers may contain alkoxysilane moieties or such isocyanate functional prepolymers may be blended with isocyanate functional preopolymers which do not contain alkoxysilane moieties. The isocyanate functional prepolymers may contain sufficient alkoxysilane moieties to improve the adhesion to substrates, for instance glass and coated substrates. The alkoxysilane content in the isocyanate functional prepolymers is preferably about 0.2 percent by weight or greater, more preferably about 0.4 percent by weight or greater and most preferably about 0.8 percent by weight or greater. The alkoxysilane content in the isocyanate functional prepolymers is preferably about 6.0 percent by weight or less, more preferably about 5.0 percent by weight or less and most preferably about 4 percent by weight or less. Alkoxysilane content means the weight percentage of alkoxysilane moieties to the total weight of the prepolymer. Silanes having groups reactive with isocyanate moieties, can be reacted with the terminal isocyanate moieties of isocyanate functional prepolymers. Such reaction products are disclosed in U.S. Pat. Nos. 4,374,237 and 4,345,053 relevant parts incorporated herein by reference. Silanes having isocyanate reactive moieties reactive with isocyanate moieties may be reacted into the backbone of the prepolymer by reacting such silane with the starting materials during the preparation of the prepolymer such process is disclosed in U.S. Pat. No. 4,625,012, relevant portions incorporated herein by reference.

The isocyanate functional prepolymers may be prepared by any suitable method, such as bulk polymerization and solution polymerization. The reaction to prepare the prepolymers is carried out under anhydrous conditions, preferably under an inert atmosphere such as a nitrogen blanket and to prevent crosslinking of the isocyanate groups by atmospheric moisture. The reaction is preferably carried out at a temperature from about 0° C. to about 150° C., more preferably from about 25° C. to about 90° C., until the residual isocyanate content determined by titration of a sample is very close to the desired value. The reactions to prepare the prepolymer may be carried out in the presence of urethane catalysts, for example: stannous salts of carboxylic acids, such as stannous octoate, stannous oleate, stannous acetate, and stannous laurate; dialkyltin dicarboxylates, such as dibutyltin dilaurate and dibutyltin diacetate; tertiary amines; and tin mercaptides, preferably stannous octoate. The amount of catalyst employed is from about 0.005 to about 5 parts by weight of the mixture catalyzed. Preferably, the reaction is carried out in admixture with a plasticizer.

The one or more isocyanate functional prepolymers are present in the composition of the invention in a sufficient amount such that the cured composition has sufficient strength for its designed purpose, in the case of adhesive systems such that the adhesive is capable of bonding substrates together and to provide the desired cohesive and adhesive strengths. Preferably, such prepolymers are present in an amount of about 20 percent by weight or greater based on the weight of the composition, more preferably about 30 percent by weight or greater and most preferably about 50 percent by weight or greater. Preferably, the prepolymers are present in an amount of about 70 percent by weight or less based on the weight of the composition, more preferably about 60 percent by weight or less and most preferably about 55 percent by weight or less. Wherein such components (a) comprise one or more isocyanate functional prepolymers and one or more of prepolymers containing isocyanate functional groups and alkoxysilane groups, the one or more prepolymers containing isocyanate functional groups and alkoxysilane groups are present in an amount of about 1 percent by weight or greater based on the weight of the composition, more preferably about 5 percent by weight or greater and more preferably about 10 percent by weight or greater. In such embodiment the one or more of prepolymers containing isocyanate functional groups and alkoxysilane groups are present in an amount of to less than 70 percent by weight, more preferably 50 percent by weight or less and most preferably about 20 percent by weight or less. In this embodiment the remainder of the prepolymer is one or more isocyanate functional prepolymers that do not contain alkoxysilane groups.

The compositions further comprise one or more amorphous linear polymers having sufficient polarity to form a homogeneous mixture with the one or more isocyanate functional prepolymers and having a hydroxyl number of about 10 or less. The one or more amorphous linear polymers function to prevent sagging of the compositions and to improve the storage stability of the compositions. Sufficient polarity to form a homogeneous mixture with the one or more isocyanate functional prepolymers means that a sufficient number of polar groups are included in the amorphous linear polymers to allow the polymers to blend with the isocyanate functional prepolymers so as to form a homogeneous mixture. Homogeneous mixture means a one phase mixture. Amorphous means that the polymer contains no significant crystalline structure, that is an amount of crystalline structure that does not impact the properties of the polymer. Preferably the polymers do not contain crystalline structure or domains or form crystalline structures or domains with heating and cooling. The polarity may be introduced by inclusion of polar containing monomers or by grafting polar containing compounds to the linear backbone. The amorphous linear polymers contain linear backbones and sufficient functional groups to provide the required polarity. The one or more amorphous linear polymers are preferably solid at ambient temperatures, about 20° C. to about 25° C. Preferably the one or more amorphous linear polymers exhibit a glass transition temperature above ambient temperatures and preferably about 50° C. or greater. Preferably the one or more amorphous linear polymers exhibit a glass transition temperature of about 130° C. or less and more preferably about 100° C. or less. Preferably the one or more amorphous linear polymers exhibit a softening point above ambient temperatures and preferably about 60° C. or greater. Preferably the one or more amorphous linear polymers exhibit a softening point above ambient temperatures and preferably about 140° C. or less and more preferably about 110° C. or less. Preferably the one or more amorphous linear polymers exhibit a hydroxyl number of about 10 or less. Preferably the polarity is about 0.1 or greater and more preferably about 0.4 or greater. Preferably the polarity is about 1.7 or less and more preferably about 1.0 or less. Exemplary amorphous linear polymers include amorphous thermoplastic polymers having a linear backbone and polar groups, polyester-polyether block copolymers, polyamides and copolymers thereof, copolyesters, and the like. The polyester-polyether block copolymers comprise one or more polyester and one or more polyether blocks. The polyether blocks are linear blocks or polyether polyols as described herein. Preferred polyester polyols are prepared from linear diacids and linear diols. A more preferred diacid is adipic acid. More preferred diols are the $C_{2-6}$ diols, with butane diols, pentane diols and hexane diols being most preferred. Preferred thermoplastic polymers include polyolefins prepared with polar copolymers or having polar compounds grafted to the backbone. Preferred polyolefins include polyethylene, polypropylene, butadiene, isoprene, and the like. Preferred polar compounds include acrylic acid, methacrylic acid, acrylate esters, methacrylate esters, acrylonitrile, maleic anhydride, and the like. Among preferred thermoplastic polymers are maleic anhydride grafted polyolefins, copolymers of a polyolefin and one or more of methacrylic acid, acrylate esters, methacrylate esters, acrylonitrile, and the like, for instance ethylene acrylic acid based polymers. The one or more amorphous linear polymers are present in a sufficient amount to prevent sagging of the compositions and to improve the storage stability of the compositions. Preferably the one or more amorphous linear polymers are present in an amount of about 0.1 percent by weight or greater based on the weight of the composition and more preferably about 0.5 percent by weight or greater. Preferably the one or more amorphous linear polymers are present in an amount of about 10 percent by weight or less based on the weight of the composition, more preferably about 6 percent by weight or less and most preferably about 2.0 percent by weight or less.

One-part polyisocyanate functional compositions and either or both of the resin part and the curative part for two-part isocyanate functional systems may contain plasticizers, fillers, pigments, stabilizers and other additives commonly present in curable polyurethane forming adhesives. By the addition of such materials, physical properties such as rheology, flow rates and the like can be modified. To prevent premature hydrolysis of the moisture sensitive groups of the isocyanate functional component, fillers should be thoroughly dried before admixture therewith.

The compositions preferably contain plasticizers, such as those commonly used in polyurethane compositions, present in an amount sufficient to disperse the isocyanate functional prepolymers in the final compositions. The plasticizers can be added to the composition either during preparation of the prepolymers or during compounding of the composition. Exemplary plasticizers include straight and branched alkylphthalates, such as diisononyl phthalate, dioctyl phthalate and dibutyl phthalate, a partially hydrogenated terpenes, trioctyl phosphate, alkylsulfonic acid esters of phenol (Mesamoll, Bayer), toluene-sulfamide, adipic acid esters, castor oil, xylene, 1-methyl-2-pyrrolidinone and toluene. The plasticizers may branched plasticizers, such as branched chain alkyl phthalates(di-isononyl phthalates (available under the Trademark PLATINOL N from BASF)). The amount of plasticizer used is that amount sufficient to give the desired rheological properties and disperse the components in the composition of the invention. Preferably, the plasticizer is present in about 1 percent by weight or greater of the composition, more preferably about 5 percent by weight or greater and most preferably about 10 percent by weight or greater. Preferably, the plasticizer is present in about 50 percent by weight or less of the composition and more preferably about 40 percent by weight or less.

The composition may comprise components to control the rheology, viscosity, pumpability and the sag characteristics of the composition, such as one or more fillers or thixotropes. These materials are added in a sufficient amount such that the composition exhibits the desired rheology, viscosity and the sag characteristics. Any rheology control component that provides acceptable rheology for the desired use may be utilized, for example coated and uncoated calcium carbonate, fumed silica, organically modified fumed silicas, polyvinylchloride powder (which may be swollen in hydrocarbon solvents, such as aromatic hydrocarbons), polyureas, polyamide waxes, castor oil derivatives, organoclays, and the like. The rheology control additives are added in a sufficient amount to control the flow of the material during and after application, the amount of control varies by application, for example an amount capable of maintaining the shape of an extruded shape, such as a triangular bead (25 mm tall, 10 mm wide), without movement on vertical surface after application, while maintaining a low enough viscosity to be applied. Preferably the rheology control additives may be present in an amount of about 0.5 or greater based on the weight of the compositions, more preferably about 1.0 by weight or greater and most preferably about 2.0 by weight or greater. The rheology control additives may be present in an amount of about 3 percent by weight or less based on the weight of the composition and more preferably about 2 percent by weight or less. Preferably these components are added such that the composition exhibits a press flow viscosity of about 8 grams per minute or higher, more preferably about 12 grams per minute or higher and most preferably about 16 grams per minute or higher to allow for application with a manual dispensing gun.

One or more types of fillers may be utilized in the composition for a variety of reasons such as to reinforce the composition, adjust viscosity and rheology, render the composition hand-gun applicability and strike a balance between cost and the desired properties of the composition and parts thereof. Exemplary classes of fillers include reinforcing fillers, clays, non-pigmented fillers, thixotropes and combinations thereof.

One preferred group of fillers are fillers that impart a balance of cost and viscosity to each part and comprise clays and non-pigmented fillers. Such fillers are used in a sufficient amount to impart an acceptable balance of viscosity and cost to the formulation and to achieve the desired properties of the composition. Among fillers useful for this purpose are clays, untreated and treated talc, and calcium carbonates. Preferred clays useful in the invention include kaolin, surface treated kaolin, calcined kaolin, aluminum silicates and surface treated anhydrous aluminum silicates. Kaolin is also known as Kaolinite and comprises compounds represented by the chemical formula $Al_2Si_2O_5(OH)_4$, and it most often occurs as clay-sized, platelike, hexagonally shaped crystals. The clays can be used in any form which facilitates formulation of a composition having the desired properties, for example a composition that can be utilized a hand-dispensable adhesive. Preferably, the clay is admixed in the form of pulverized powder, spray-dried beads or finely ground particles. Preferably, the clays or non-pigmented fillers are present in an amount sufficient to render the rheology of the composition suitable to function as desired, such as an adhesive applicable by hand-gun. Preferably the clays or non-pigmented fillers may be used in an amount of about 0 percent by weight or greater of the composition, more preferably about 3 percent by weight or greater, and even more preferably about 5 percent by weight or greater, even more preferably about 10 percent by weight or greater and most preferably about 16 percent by weight or greater. Preferably, the clays or non-pigmented fillers may be used in an amount of about 60 percent by weight or less of the composition of the invention, more preferably about 50 percent by weight or less, more preferably about 30 percent by weight or less and most preferably about 23 percent by weigh or less.

The composition may comprise a reinforcing filler present to improve the strength and rheology of the composition, which preferably comprises one or more forms of carbon black or titanium dioxide. The reinforcing filler is present in a sufficient amount to reinforce the composition and to improve the rheology of the composition. Preferably, the reinforcing filler is present in an amount such that the parts of the composition are nonconductive. Nonconductivity is generally understood to mean an impedance of the composition of at least $10^{10}$ Ohm-cm. When carbon black is used as the reinforcing filler, the carbon black used may be a standard carbon black. Standard carbon black is carbon black which is not specifically surface treated or oxidized to render it nonconductive. One or more nonconductive carbon blacks may be used in conjunction with the standard carbon black. The amount of standard carbon black in the composition is that amount which provides the desired color, viscosity, sag resistance and strength and is below the percolation threshold of the carbon black in the composition. The percolation threshold is the concentration at which the composition becomes conductive. If nonconductivity of the composition is desired, standard carbon black may be utilized at a level at which the composition is nonconductive. The non-conductive carbon blacks may be high surface area carbon blacks, which exhibits an oil absorption of about 110 cc/100 g or greater and preferably about 115 cc/100 g or greater and/or an iodine number of about 130 mg/g or greater and preferably about 150 mg/g or greater. Preferred non-conductive carbon blacks include ELFTEX™ 57100, MONARCH RAVEN™ 1040 and RAVEN™ 1060 carbon blacks. Standard carbon blacks are well known in the art and include RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and PRINTEX™30 carbon black available from Degussa. The reinforcing filler is preferably present in the composition, based on the weight of the composition, in an amount of about 0 percent by weight or greater, more preferably about 10 percent by weight or greater and most preferably about 14 percent by weight or greater. The reinforcing filler is preferably present the composition, based on the weight of the composition, in an amount of about 20 percent by weight or less, more preferably about 18 percent by weight or less, and most preferably about 16 percent by weight or less. If a non-conductive composition is desired the concentration of conductive carbon black is preferably below about 18 percent by weight in the overall composition and more preferably below about 16 percent by weight.

The composition may further comprise a polyfunctional isocyanate for the purpose of improving the modulus of the composition in the cured form. The polyisocyanates can be any monomeric, oligomeric or polymeric isocyanates having a nominal functionality of about 3 or greater, more preferably about 3.2 or greater. Preferably, the polyfunctional isocyanates have a nominal functionality of about 5 or less, even more preferably about 4.5 or less and most preferably about 4.2 or less. The polyfunctional isocyanates can be any isocyanates which are reactive with the isocyanate functional component and which improve the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300, DESMODUR N3400 DESMODUR N-100, and polymeric isocyanates such as polymeric MDI (methylene diphenyl diisocyanates) such as those marketed by The Dow Chemical Company under the trademark of PAPI, including PAPI 20 and PAPI 27 polymeric isocyanates. The polyfunctional isocyanates are present in a sufficient amount to impact the modulus of the cured compositions of the invention. If too much is used, the cure rate of the composition is unacceptably slowed down. If too little is used, the desired modulus levels may not be achieved. The polyfunctional isocyanate is preferably present in an amount of about 0.5 percent by weight or greater based on the weight of the adhesive composition, more preferably about 1.0 percent by weight or greater and most preferably about 1.4 percent by weight or greater. The polyfunctional isocyanate is preferably present in an amount of about 8 percent by weight or less, based on the weight of the composition, more preferably about 5 percent by weight or less and most preferably about 3 percent by weight or less.

The compositions also contain one or more catalysts known to the skilled artisan which catalyze the reaction of isocyanate moieties with water or an isocyanate reactive moiety containing compound. Among preferred catalysts are organotin compounds, metal alkanoates, tertiary amines, or mixtures thereof. A mixture of a tertiary amine and a metal alkanoate or organotin compound is preferred, and more preferably tertiary amines, such as dimorpholino diethyl ether, and organotin compounds, such as dibutyl tin dilaurate. Exemplary organotin compounds include alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organo tin compound or metal alkanoate is present in an amount of about 60 parts per million or greater based on the weight of the composition, more preferably 120 parts by million or greater. The organo tin compound or metal alkanoate is present in an amount of about 1.0 percent or less based on the weight of the composition, more preferably 0.5 percent by weight or less and most preferably 0.1 percent by weight or less.

Exemplary tertiary amine catalysts include dimorpholinodialkyl ether, a di((dialkylmorpholino)alkyl)ether, bis-(2-dimethylaminoethyl)ether, triethylene diamine, penta-methyldiethylene triamine, N,N-dimethylcyclohexylamine, N,N-dimethyl piperazine 4-methoxy-ethyl morpholine, N-methylmorpholine, N-ethyl morpholine, diazabicyclo compounds and mixtures thereof. A preferred dimorpholinodialkyl ether is dimorpholinodiethyl ether. A preferred di-((dialkylmorpholino)alkyl)ether is (di-(2-(3,5-dimethylmorpholino)ethyl)-ether). Diazabicyclo compounds are compounds which have diazobicyclo structures. Preferred diazabicyclo hydrocarbons include diazabicycloalkanes, diazabicyclo alkene salts and mixtures thereof. Preferred diazabicycloalkanes include diazabicyclooctane, available from Air Products under the trademark and designations, DABCO, DABCO WT, DABCO DC 1, DABCO DC 2, and DABCO DC 21. Preferred diazabicycloalkene salts include diazabicycloundecene in the phenolate, ethylhexoate, oleate and formate salt forms, available from Air Products under the trademark and designations, POLYCAT SA 1, POLYCAT SA 1/10, POLYCAT SA 102 and POLYCAT SA 610. In some preferred embodiments, one or more diazabicyclo compounds and one or more organometallic and/or other tertiary amine catalysts are present in the composition. Tertiary amines are preferably employed in an amount, based on the weight of the composition of about 0.01 percent by weight or greater, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less.

The composition may further comprise stabilizers, which function to protect the composition from moisture, thereby inhibiting advancement and preventing premature cross-linking of the isocyanates or silanol groups in the curable composition, such stabilizers include diethylmalonate, alkylphenol alkylates, paratoluene sulfonic isocyanates, benzoyl chloride, calcium oxide and orthoalkyl formates. Such stabilizers are preferably used in an amount of about 0.1 percent by weight or greater based on the total weight of the curable composition, preferably about 0.5 percent by weight or greater and more preferably about 0.8 percent by weight or greater. Such stabilizers are used in an amount of about 5.0 percent by weight or less based on the weight of the curable composition, more preferably about 2.0 percent by weight or less and most preferably about 1.4 percent by weight or less.

The composition may further comprise an adhesion promoter, such as those disclosed in Mandi, U.S. Patent Publication 2002/0100550 paragraphs 0055 to 0065 and Hsieh, U.S. Pat. No. 6,015,475 column 5, line 27 to column 6, line 41 incorporated herein by reference. Preferred classes of adhesion promoters include silanes, titanates and zirconates and the like, preferably a silane in some form. Preferable methods of including silane functionality in the adhesive formulations are disclosed in Wu et al., U.S. Pat. No. 6,512,033 at column 5, line 38 to column 7, line 27; U.S. Pat. Nos. 5,623,044; 4,374,237; 4,345,053 and 4,625,012, relevant portions incorporated herein by reference. The silane may be blended with the composition, a silane, having active hydrogen moieties, can be reacted with a polyisocyanate to form an adduct which is blended with the composition, reacted with a polyurethane prepolymer or reacted with a polyisocyanate and a compound having on average more than one moiety reactive with an isocyanate moiety to form a prepolymer with both isocyanate and silane moieties (alkoxysilane groups). Preferably the adduct is a reaction product of a secondary amino- or mercapto-alkoxy silane and a polyisocyanate, the adduct having an average of at least one silane group and at least one isocyanate group per molecule (hereinafter "adduct"). Preferably such silane is a mercapto-silane or an amino-silane and more preferably is a mercapto-trialkoxy-silane or an amino-trialkoxy silane, for example: N,N-bis[(3-triethoxysilyl)propyl]amine; N,N-bis [(3-tripropoxy-silyl) propyl]amine; N-(3-trimethoxysilyl) propyl-3-[N-(3-trimethoxysilyl)-propyl amino]propionamide; N-(3-triethoxysilyl)propyl-3-[N-3-triethoxysilyl)-propyl-amino]propionamide; N-(3-trimethoxysilyl)propyl-3-[N-3-triethoxy silyl) propylamino]propionamide; 3-trimethoxysilyl propyl 3-[N-(3-trimethoxysilyl)-propyl amino]-2-methylpropionate; 3-triethoxysilylpropyl3-[N-(3-triethoxysilyl)-propylamino]-2-methyl propionate; 3-trimethoxysilylpropyl3-[N-(3-triethoxysilyl)-propylamino]-2-methyl propionate; and the like. Preferably the organo functional silane is gamma-mercaptopropyl-trimethoxysilane (available as A189 from Union Carbide) or N,N'-bis((3-trimethoxy silyl)propyl)amine. The amount of adhesion promoter present is that amount which enhances the adhesion of the composition to the substrate surface. The amount of adhesion promoter present is preferably about 0.01 percent by weight or greater based on the weight of the composition and most preferably about 0.1 percent by weight or greater. The amount of adhesion promoter used is preferably about 10 percent by weight or less, even more preferably about 2.5 percent by weight or less and most preferably about 2.0 percent by weight or less. The adhesion promoter can be located in either or both parts of a two part composition.

The composition may comprise a hydrophilic material that functions to draw atmospheric moisture into the composition, to enhance the cure speed of the formulation. Preferably, the hydrophilic material is a liquid, including pyrrolidones such as 1 methyl-2-pyrrolidone (or N-methyl pyrrolidone). The hydrophilic material is preferably present in an amount of about 0.1 percent by weight or greater and more preferably about 0.3 percent by weight or greater and preferably about 1.0 percent by weight or less and most preferably about 0.6 percent by weight or less.

The two part compositions may comprise a curing agent located in the second part, which is a compound that contains greater than one isocyanate reactive functional group, preferably hydroxyl or amine functional groups. The curing agents can be one or more chain extenders, crosslinking agents, polyols or polyamines Polyols as described hereinbefore can be utilized as curing agents. One class of polyols or polyamines can be prepolymers as described hereinbefore prepared utilizing excess equivalents of active hydrogen functional groups such that the resulting prepolymers contain active hydrogen functional groups, preferably hydroxyl and or amino groups. The curing agent may comprise one or more low molecular weight compounds having two or more isocyanate reactive groups and a hydrocarbon backbone wherein the backbone may further comprise one or more heteroatoms. It is advantageous to use such low molecular weight compounds in two-part compositions. Such low molecular weight compounds may be compounds known in the art as chain extenders, difunctional compounds, or crosslinkers, having, on average, greater than two active hydrogen groups per compound. Preferably, the molecular weight of the low molecular weight compound is about 250 or less, more preferably about 120 or less and more preferably about 100 or less. The low molecular weight compound is used in a sufficient amount to obtain the desired G-Modulus (E-Modulus). In two-part compositions, the low molecular compound may be located in the resin side, the curative side or both, preferably the curative side. Preferably, the low molecular weight compound is present in composition in an amount of about 2 percent by weight or greater, more preferably about 2.5 percent by weight or greater and most preferably about 3.0 percent by weight or greater. Preferably, the low molecular weight compound is present in the composition in an amount of about 10 percent by weight or less, more preferably about 8 percent by weight or less and most preferably about 6 percent by weight or less.

In a two-part composition, the curative part may further comprise polyoxyalkylene polyamine having 2 or greater amines per polyamine, preferably 2 to 4 amines per polyamine and most preferably 2 to 3 amines per polyamine Preferably, the polyoxyalkylene polyamine has a weight average molecular weight of about 200 or greater and most preferably about 400 or greater. Preferably, the polyoxyalkylene polyamine has a weight average molecular weight of about 5,000 or less and most preferably about 3,000 or less. Among preferred polyoxyalkylene polyamines are JEFFAMINE™ D-T-403 polypropylene oxide triamine having a molecular weight of about 400 and JEFFAMINE™ D-400 polypropylene oxide diamine having a molecular weight of about 400. The polyoxyalkylene polyamines are present in a sufficient amount to prevent the composition from sagging once mixed and applied. Preferably, the polyoxyalkylene polyamine is present in the curable composition in an amount of about 0.2 percent by weight or greater, more preferably about 0.3 percent by weight or greater and most preferably about 0.5 percent by weight or greater. Preferably, the polyoxyalkylene polyamine is present in the curable composition in an amount of about 6 percent by weight or less, more preferably about 4 percent by weight or less and most preferably about 2 percent by weight or less.

In some preferred embodiments the curing agent comprises one or more polyols. Any polyol having groups reactive with isocyanate moieties, including those disclosed and preferred herein may be utilized as curing agents. Particularly preferred polyols useful as curing agents include polyols having dispersed therein or grafted to their backbones organic particles as described herein, of which polyols having styrene acrylonitrile (SAN) particles dispersed therein or grafted to the backbone are particularly preferred. Curing agents are used in a sufficient amount such that the two part compositions cure to provide the desired properties as described herein. Preferably the curing agents, recited compounds or mixtures of recited compounds useful as curing agents including polyols, are present in an amount of about 10 percent by weight or greater of the second part, more preferably about 20 percent by weight or greater and most preferably about 30 percent by weight or greater. Preferably the polyol curing agents are present in an amount of about 60 percent by weight or less of the second part, more preferably about 50 percent by weight or less and most preferably about 40 percent by weight or less.

The compositions may also contain other durability stabilizers known in the art, including alkyl substituted phenols, phosphites, sebacates and cinnamates and preferably organophosphites. The durability stabilizers are preferably present in a sufficient amount to enhance the durability of bond of the adhesive composition to the substrate surface. Exemplary phosphites are disclosed in Hsieh et al. U.S. Pat. No. 7,416,599 column 10, line 47 to Column 11 line 25, incorporated herein by reference. Preferably, the durability stabilizers are present in the composition in an amount of about 0.1 percent by weight or greater and more preferably about 0.2 percent by weight or greater based on the weight of the composition. Preferably the durability stabilizers are present in the composition in an amount of about 1.0 percent by weight or less and more preferably about 0.5 percent by weight or less based on the weight of the composition.

The compositions may further include a light stabilizer, which facilitates the system maintaining durable bond to the substrate for a significant portion of the life of the structure to which it is bonded. Preferred light stabilizers are hindered amine light stabilizers, such as disclosed in Hsieh et al. U.S. Pat. No. 7,416,599 column 11, line 31 to line 63, incorporated herein by reference. More preferred hindered light amine stabilizers include Tinuvin 1,2,3 bis-(1-octyloxy-2,2, 6,6, tetramethyl-4-piperidinyl) sebacate and Tinuvin 765, bis(1,2,2,6,6,-pentamethyl-4-piperidinyl) sebacate. A sufficient amount of light stabilizer to enhance the bond durability to the substrate may be used. Preferably, the light stabilizer is used in amount of about 0.1 percent by weight or greater based on the weight of the composition, more preferably 0.2 percent by weight or greater and most preferably about 0.3 percent by weight or. Preferably, the amount of light stabilizer present is about 3 weight percent or less based on the weight of the composition, more preferably about 2 weight percent or less and most preferably about 1 weight percent or less.

The composition may further comprise an ultraviolet light absorber which enhances the durability of the bond of the composition to a substrate, for example benzophenones and benzotriazoles and those disclosed in Hsieh et al. U.S. Pat. No. 7,416,599 column 11, line 64 to Column 12 line 29, incorporated herein by reference. More preferred UV light absorbers include Cyasorb UV-531 2-hydroxy-4-n-octoxy-benzophenone and Tinuvin 571 2-(2H-benzotriazol-2-yl)-6-dodecyl-4-methylphenol, branched and linear. The UV light absorber is used in sufficient amount to enhance the durability of the bond of the adhesive to the substrate. The UV absorber may be used in an amount of about 0.1 percent by weight or greater based on the weight of the composition, more preferably about 0.2 weight percent or greater and most preferably about 0.3 weight percent or greater. The UV light inhibitor may be used in amount of about 3 percent by weight or less based on the weight of the composition, more preferably about 2 percent by weight or less and most preferably about 1 percent by weight or less.

The composition may be formulated by blending the components together using means well known in the art, such as in a suitable mixer. The blending is preferably conducted in an inert atmosphere, such as nitrogen or argon, in the absence of oxygen and atmospheric moisture to prevent premature reaction. Alternatively, the plasticizers can be added during blending of all the components. The ingredients are blended for a sufficient time to prepare a well blended mixture, preferably from about 10 to about 60 minutes. Once formulated, it is packaged in a suitable container such that it is protected from atmospheric moisture and oxygen.

The compositions may be used to bond a variety of substrates together, such as porous and nonporous substrates. The compositions are applied to a substrate and the composition on the first substrate is thereafter contacted with a second substrate. The surfaces to which the composition may be applied may be cleaned activated and/or primed prior to application of the composition, see for example, U.S. Pat. Nos. 4,525,511; 3,707,521 and 3,779,794, relevant parts are incorporated herein by reference. The compositions are applied at temperature at which they can be pumped. The one part adhesive compositions cure in the presence of atmospheric moisture, which is sufficient to result in curing of the composition. Curing can be accelerated by the addition of additional water or by applying heat to the curing composition by means of convection heat, induction heat, infrared heating, microwave heating and the like. The compositions may be formulated to provide an open time of at least about 3 minutes or greater more preferably about 5 minutes or greater. "Open time" is understood to mean the time after application of the composition to a first substrate until it starts to become a high viscous paste and is not subject to deformation during assembly to conform to the shape of and adhere to the second substrate.

The compositions may be used to bond glass or abrasion coated transparent plastic to other substrates such as metal or plastics, for example the first substrate is a window and the second substrate is a window frame of an automobile or a building. Preferably, the window is cleaned and may have a wipe or primer applied to the area to which the composition is to be bonded. The window flange may be primed with a paint primer. The composition is applied in a bead to the periphery of the window located such that it will contact the window flange when placed in the vehicle. The window with the composition located thereon is then placed into the flange with the composition located between the window and the flange. The bead of the composition is a continuous bead that functions to seal the junction between the window and the window flange. A continuous bead of the composition is a bead that is located such that the bead connects at each end to form a continuous seal between the window and the flange when contacted. Thereafter the composition is allowed to cure.

In use, the components of two-part compositions are blended as would normally be done when working with such materials. In two-part compositions, the volume ratio at which the two parts are combined is preferably a convenient whole number to facilitate application of the curable composition with conventional, commercially available dispensers including static and dynamic mixing. The blended polymerizable composition is extruded from the mixing chamber onto a substrate. When using electrically-driven equipment, dynamic mixing may be used Some common mix ratios are 1:1, 2:1, 4:1 and 10:1 and can also be odd ratios, preferably about 1:1. Two-part adhesive compositions start to cure upon mixing the two parts. Curing can be accelerated by applying heat to the curing adhesive using induction heat, convection heat, infrared heating, microwave heating and the like.

One part adhesives of the invention containing isocyanate functional prepolymers and isocyanate functional prepolymers containing alkoxysilane groups bond especially well to clear primers such as those disclosed in U.S. Pat. No. 7,416,599 incorporated herein by reference, which discloses a composition comprising a) one or more organotitanates having four ligands wherein the ligands are hydrocarbyl, optionally containing one or more functional groups having one or more heteroatoms selected from the group comprising oxygen, nitrogen, phosphorus and sulfur wherein two or more of the ligands may form a cyclic structure; b) one or more mercaptosilanes; c) one or more polyaminosilanes; d) one or more secondary aminosilanes; and e) a solvent which dissolves the components of the composition. In one embodiment the invention is a system or kit comprising the compositions of the invention and the clear primers.

The composition may be used to replace windows in structures or vehicles and most preferably in vehicles. The first step is removal of the previous window. This can be achieved by cutting the bead of the adhesive holding the old window in place and then removing the old window. Thereafter, the new window is cleaned and if needed primed. The old adhesive that is located on the window flange can be removed, although it is not necessary and in most cases it is left in place, but may be cut flat with a cutting tool. The window flange is preferably primed with a paint primer. The adhesive is applied in a bead to the periphery of the window located such that it will contact the window flange when placed in the vehicle. The window with the adhesive located thereon is then placed into the flange with the adhesive located between the window and the flange. Alternatively, the adhesive may be applied to the window flange. The adhesive bead is a continuous bead that functions to seal the junction between the window and the window flange.

ILLUSTRATIVE EMBODIMENTS OF THE INVENTION

The following examples are provided to illustrate the invention, but are not intended to limit the scope thereof. All parts and percentages are by weight unless otherwise indicated.

Press Flow Viscosity—In order to determine the Press Flow viscosity the flowing procedure is utilized. An extrusion viscometer and a nozzle with a diameter of 4 mm, length of 1.8 cm are utilized. The applied pressure is 4 bar. Within a time period of 60 seconds material is extruded onto a sheet of paper and the weight is determined. The Press Flow viscosity defines the amount of material [g] that is extruded within 60 seconds.

Tailing Resistance—The tailing, respectively thread, is determined via manual application. A Betagun™ hand applicator gun with the Renault-nozzle and nozzle are placed against a perpendicular wall to apply an adhesive bead a 90° angle. The application gun movement to apply the adhesive bead is constant to form a uniform bead and the nozzle is pulled off the surface of the wall with uniform moderate speed. The tail is formed as the nozzle of the gun is removed and the length is measured and recorded in millimeters (mm).

Figure 1:
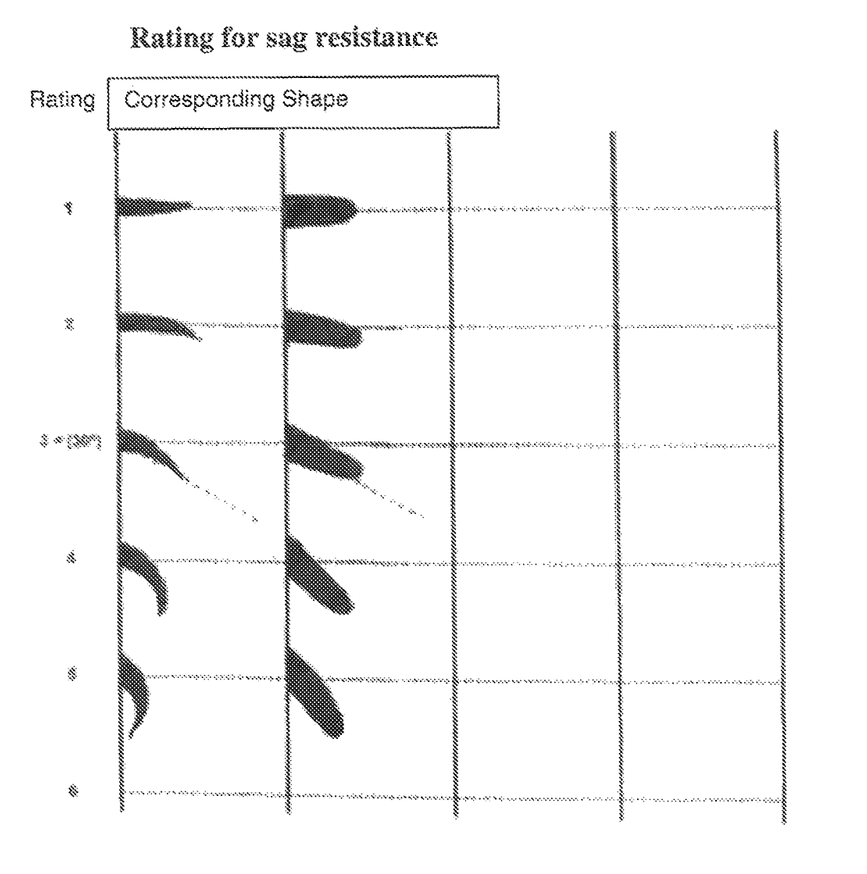
FIG. 1 shows different adhesive bead sag levels

Sag Resistance—The sag resistance is determined by applying a bead of approximately 20 cm of length on a perpendicular wall with a Betagun™ hand applicator gun with Renault-nozzle having a nozzle profile of 20 mm in height and has a base of 5 mm. The sag resistance is rated in degrees of sagging or mm as it moves downward. The rating is 1 to 5, 1 the best and 5 the worst. 3 is considered unacceptable. FIG. 1 provides the sag resistance measurement chart of the cross section of a bead on a perpendicular wall.

G-Modulus is determined according to DIN 54451. Conductivity is determined according to DIN IEC 93/VDE 0303/HD 429 S1. Lap shear strength and Extension at brake are determined according to DIN 53504

Tack free time—Tack free time is determined by applying continuous triangular bead of adhesive using a BETA-GUN™ applicator at maximum speed onto a polyethylene sheet on a pre-marked path. Upon the start of application a stopwatch is started. A bead of 9-10 mm base and height at a rate of about 10 seconds for one traverse and about 90 seconds for a 450 ml application. At intervals of 10 seconds a clean wooden spatula is used to compress the bead up to half of its original height and then lifted up from the bead. Application of the spatula is slow and deliberate and the spatula is kept in a plane parallel to the polyethylene sheet, moved vertically down and then up, so as not to disturb the bead on either side of the compressed area, at 90° angle to the direction of the bead. The working time is the elapsed time until the wooden spatula is no longer wetted out by the adhesive The values are rounded to the nearest half minute.

Ingredients

Prepolymer 1 a reaction product of MDI (methylene diphenyl isocyanate) and a mixture of polyether diol and a polyether triol prepared as described in US 2010/0154969 prepolymer 1, incorporated herein by reference.

Prepolymer 2 a reaction product of MDI (methylene diphenyl isocyanate) and a mixture of polyether diol and a polyether triol having styrene acrylonitrile particles grafted thereto prepared as described in US 2010/0154969 prepolymer 3, incorporated herein by reference.

Amorphous linear polymer a block copolymer of polyether segments and polyester segments available under the trademark and designation DYNAPOL S1611

Polyester prepolymer prepared as described in US 2010/0154969 prepolymer 4, incorporated herein by reference.

Polyfunctional polyisocyanate 1 a trimer of hexamethylene diisocyanate available under the trademark and designation DESMODUR N 100

Polyfunctional polyisocyanate 2 a trimer of hexamethylene diisocyanate available under the trademark and designation DESMODUR N 3300

Carbon Black 1 a non-conductive Carbon Black available under the trademark MONARCH 120

Carbon Black 2 a Conductive Carbon Black available under the trademark PRINTEX 30

Carbon Black 3 non-conductive carbon black available under the trademark RAVEN 1020

Clay 1 kaolin clay available under the trademark and designation POLESTAR 200R

Clay 2 kaolin clay available under the trademark and designation HUBER 70

Polyether Polyol a polypropylene ether trifunctional polyol having a OH number of 56 containing 40 percent by weight of a fine-particle, sedimentation-stable dispersion available under the trademark and designation ARCOL 1096.

Di-isononyl phthalate; Diethyl malonate dibutyl tin dilaurate catalyst; dimorpholino diethyl ether Silica pyrogenic silica available under the trademark and designation WACKER HDK Calcium carbonate available under the trademark and designation CARBITAL 140 Epoxy silane gamma-glycidoxypropyltrimethoxysilane Non-calcined kaolin available from Imerys under the Trademark POLEWHITE D.

BETAPRIME™ 5500 primer contains prepolymers having isocyanate and alkoxysilane functional groups in methyl ethyl ketone, BETAWIPE™ 6600t primer is a clear primer containing according to U.S. Pat. No. 7,416,599 comprising a) one or more organotitanates; b) one or more mercaptosilanes; c) one or more polyaminosilanes; d) one or more secondary aminosilanes; and e) a solvent BETAWIPE™ HYDRO primer containing an alkoxysilane amine, an alkoxylate alcohol and water Preparation of Adhesives. In the examples the two part and one part adhesives are prepared as follows. All liquids (prepolymers, NCO-crosslinker, plasticizer, solvent) are placed in a Molteni planetary mixer and mixed for 60 minutes under vacuum for degassing, at 120° C. Then all pigments are added while hot and mixed for another 30 minutes under vacuum. Then the mixture is heated to 80° C. and mixed for 15 minutes under vacuum. When the temperature has reached 80° C. the appropriate amount of polyester prepolymer is added, where used. The compound is mixed for 15 minutes under vacuum. Then the catalyst is added and the mixture is mixed for 15 minutes under vacuum. After the mixture has been homogeneously mixed it is transferred into cartridges for testing and analysis. For testing, the two parts are contacted and applied to the appropriate substrates or used as test specimens. The one part is applied directly. Table 1 contains the formulations prepared as described above and the results of property testing.

TABLE 1

| Component | Example | | | | |
|---|---|---|---|---|---|
|  | 1 | 2 | 3 | 4 | 5 |
| Part 1 | | | | | |
| Prepolymer 1 | 57.71 | 46.6 | 42.6 | 47.6 | 48.1 |
| Prepolymer 2 | 0 | 15 | 15 | 15 | 15 |
| Amorphous linear polymer | 0 | 1.5 | 0.5 | 0.5 | 0 |
| Polyester prepolymer | 4.83 | 0 | 0 | 0 | 0 |
| Polyfunctional polyisocyanate 1 | 0 | 1.9 | 1.9 | 1.9 | 1.9 |
| Carbon Black 1 | 22.2 | 3 | 8 | 3 | 0 |
| Carbon Black 2 | 0 | 12 | 12 | 12 | 15 |
| Clay 1 | 13.32 | 20 | 20 | 20 | 20 |
| Sum | 100 | 100 | 100 | 100 | 100 |
| Part 2 | | | | | |
| Polyether polyol | 68.4 | 68.4 | 68.4 | 68.4 | 68.4 |
| Diisononyl phthalate | 4.3 | 4.3 | 4.3 | 4.3 | 4.3 |
| Diethyl Malonate | 1.9 | 1.9 | 1.9 | 1.9 | 1.9 |
| Tin Catalyst | 0.7 | 0.7 | 0.7 | 0.7 | 0.7 |
| Dimorpholinodiethyl ether | 0.15 | 0.15 | 0.15 | 0.15 | 0.15 |
| Clay | 12.2 | 12.2 | 12.2 | 12.2 | 12.2 |
| Carbon Black 2 | 8.5 | 8.5 | 8.5 | 8.5 | 8.5 |
| Carbon Black 3 | 3.85 | 3.85 | 3.85 | 3.85 | 3.85 |
| Sum | 100 | 100 | 100 | 100 | 100 |
| Testing | | | | | |
| Part 1 Press Flow 4 mm, 4 bar 23° C. g/min | 20 | 26.5 | 11.4 | 26.4 | 64 |
| 2 Press Flow 4 mm, 4 bar 23° C. g/min | 20 | 20 | 20 | 20 | 20 |
| Sag Degree [°] | 40 | 40 | 25 | 30 | 60 |
| Tail A + B mm | 40 | 10 | 20 | 10 | 30 |
| 1 h Lap Shear MPa | 3.2 | 3.5 | 4.2 | 3.9 | 3.2 |
| G Modulus MPa | 1.6 | 2.4 | 2.7 | 2.4 | 1.7 |
| 7 d Lap Shear MPa | 7.0 | 7.3 | 7.4 | 7.8 | 6.9 |
| Elongation % | 180 | 180 | 170 | 190 | 190 |

Examples 6 to 7

One part adhesives are prepared as discussed above using the ingredients listed in Table 2 and tested using the procedures listed above. The results are listed in Table 2

TABLE 2

| | Example | |
|---|---|---|
| Component | 6 | 7 |
| Prepolymer 1 | 56.10 | 50.13 |
| Polyester Prepolymer | 2.30 | 2.30 |
| Amorphous linear polymer | 1.20 | 0 |
| Polyfunctional polyisocyanate 2 | 1.30 | 1.00 |
| Clay 2 | 9.40 | 13.0 |
| Tin Catalyst | 1.00 | 1.200 |
| Dimorpholinodiethyl ether | 0.10 | 0.20 |
| Silica | 0.80 | 1.00 |
| Carbon Black 2 | 19.2 | 15.00 |
| Calcium carbonate | 0 | 16.7 |
| Epoxy silane | 0.40 | 0 |
| Sum | 100 | 100 |
| Testing | | |
| Ballan 4 mm, 4 bar 55° C. g/min initial | 53.0 | 50.0 |
| Ballan 4 mm, 4 bar 55° C. g/min 1 month @ 40° C. | 41.4 | 23.7 |
| Ballan 4 mm, 4 bar 55° C. g/min 2 month @ 40° C. | 32.0 | 22.4 |
| Ballan 4 mm, 4 bar 55° C. g/min 3 month @ 40° C. | 28.0 | 15.1 |
| Tail A + B mm | 10 | 10 |
| Lap Shear MPa After 7 days | 7.9 | 5.8 |
| G Modulus MPa | 2.9 | 3.6 |
| Elongation % | 355 | 280 |
| Tensile Strength MPa | 7.5 | 6.9 |
| Density g/ml | 1.27 | 1.43 |

The adhesive of Example 6 is bonded to the ceramic enamel frit on a glass coupon with three different primers (BETAPRIME™ 5500, BETAWIPE™ 6600t and BETAWIPE™ HYDRO primers) applied to the surface to which the adhesive is bonded. The surface bonded to is cleaned using a glass cleaner, BETACLEAN™ 3300 glass cleaner, the primer is applied to the surface of the substrate and allowed to dry for 5 minutes. A bead of the adhesive of example 7 is applied to the substrate according to the Quick Knife Adhesion test. The samples are cured at 23° C. at 50 percent relative humidity (RH) for 1 day and then exposed to different temperature/humidity conditions. The first Quick knife adhesion test is performed after 7 days at 23° C. at 50% RH; then placed in water at 23° C. for additional 7 days; then placed at 90° C. for 7 days and finally held for 24 hours at 23° C. at 50% RH. The sample is exposed to Cataplasm conditions, 7 days at 70° C. at 100% RH then 16 hours at −20° C. and held for another 24 hours at 23° C. at 50% RH. Example 7 demonstrated 100 percent cohesive failure (the cured material breaks before the adhesive bond breaks) with all three primers under all three conditions.

What is claimed is:
1. A composition comprising
   a) one or more isocyanate functional prepolymers;
   b) one or more amorphous linear polymers comprising blocks of polyester and polyalkylene oxides or a polyolefin polymer containing polar co-monomers or polar compounds grafted to the backbone wherein the one or more amorphous linear polymers have sufficient polarity to form a homogeneous mixture with the one or more isocyanate functional prepolymers and a hydroxyl number of about 10 or less which are present in the composition in an amount of about 0.1 to less than 10 percent by weight based on the composition;

c) one or more forms of carbon black;
d) one or more catalysts for the reaction of isocyanate moieties with active hydrogen atom containing groups;
f) one or more fillers other than carbon black; and
g) one or more plasticizers;
wherein the composition is useful as an adhesive and can be applied at ambient temperatures.

2. A composition according to claim 1 wherein the one or more amorphous linear polymers are solid at 25° C. and exhibit a glass transition temperature of from about 50 to about 130° C.

3. A composition according to claim 1 wherein the one or more fillers other than carbon black comprise one or more of calcium carbonate and clay.

4. A composition according to claim 1 wherein the one or more prepolymers containing isocyanate functional groups comprise one or more prepolymers containing isocyanate functional groups and alkoxysilane groups.

5. A composition according to claim 1 wherein the composition is a one part composition.

6. A composition according to claim 1 wherein the one or more forms of carbon black comprise non-conductive carbon black, conductive carbon black, or a mixture thereof, present in an amount below the percolation threshold for the composition.

7. A composition according to claim 1 wherein composition contains one or more adhesion promoters in an amount of about 0.1 to about 2.5 percent by weight of the composition.

8. A composition according to claim 1 wherein:
a) the one or more isocyanate functional prepolymers are present in an amount of about 20 to about 70 percent by weight based on the weight of the composition;
b) one or more amorphous linear polymers are present in an amount of about 0.1 to about 6 percent by weight based on the weight of the composition;
c) the one or more forms of carbon black are present in an amount of about 5 to about 20 percent by weight based on the weight of the composition;
d) the one or more catalysts for the reaction of isocyanate moieties with hydroxyl groups are present in an amount of about 0.005 to about 2 percent by weight based on the weight of the composition;
f) the one or more fillers other than carbon black are present in an amount of about 3 to about 30 percent by weight based on the weight of the composition; and
g) the one or more plasticizers are present in an amount of about 1 to about 50 percent by weight of the composition.

9. A composition comprising a first part and a second part;
a) one or more isocyanate functional prepolymers present in an amount of about 20 to about 70 percent by weight based on the weight of the composition;
b) one or more amorphous linear polymers comprising blocks of polyester and polyalkylene oxides or a polyolefin based polymer containing polar co-monomers or polar compounds grafted to the backbone present in an amount of about 0.1 to about 6 percent by weight based on the weight of the composition, wherein the one or more amorphous linear polymers have sufficient polarity to form a homogeneous mixture with the one or more isocyanate functional prepolymers and a hydroxyl number of about 10 or less;
c) one or more forms of carbon black present in an amount of about 5 to about 20 percent by weight based on the weight of the composition;
d) one or more catalysts for the reaction of isocyanate moieties with hydroxyl groups present in an amount of about 0.005 to about 2 percent by weight based on the weight of the composition;
e) one or more compounds, oligomers or prepolymers containing more than one functional group reactive with isocyanate groups present in an amount of about 10 to about 60 percent by weight of the second part; and
f) one or more fillers other than carbon black present in an amount of about 3 to about 30 percent by weight based on the weight of the composition;
wherein the c) one or more forms of carbon black comprise non-conductive carbon black, conductive carbon black, or a mixture thereof, present in an amount below the percolation threshold for the composition; and wherein components a) and b) are in the first part and components d) and e) are in the second part.

10. A composition according to claim 9 wherein e) comprises a polyether polyol.

11. A composition according to claim 9 wherein e) comprises a polyether polyol containing organic particles dispersed therein or grafted to the backbone.

12. A composition according to claim 9 wherein e) comprises a polyether polyol containing styrene acrylonitrile particles dispersed therein or grafted to the backbone.

13. A method of bonding two or more substrates together which comprises contacting the two or more substrates together with a composition according to claim 1 disposed along at least a portion of the area wherein the substrates are in contact.

14. A method of bonding two or more substrates together which comprises contacting the two or more substrates together with a composition according to claim 9 disposed along at least a portion of the area wherein the substrates are in contact, wherein the composition is a two part composition and the parts are contacted together prior to contacting the composition with one or more of the substrates.

15. A composition according to claim 1 wherein the one or more amorphous linear polymers comprise blocks of polyester and polyalkylene oxides.

16. A composition according to claim 9 wherein the one or more amorphous linear polymers comprise blocks of polyester and polyalkylene oxides.

17. A composition according to claim 9 wherein the one or more amorphous linear polymers are solid at 25° C. and exhibit a glass transition temperature of from about 50 to about 130° C.

18. A composition according to claim 9 wherein the one or more fillers other than carbon black comprise one or more of calcium carbonate and clay.

19. A composition according to claim 9 wherein the one or more prepolymers containing isocyanate functional groups comprise one of more prepolymers containing isocyanate functional groups and alkoxysilane groups.

20. A composition according to claim 9 wherein the one or more forms of carbon black comprise non-conductive carbon black, conductive carbon black, or a mixture thereof, present in an amount below the percolation threshold for the composition.

* * * * *